US011770832B2

(12) United States Patent
Gou et al.

(10) Patent No.: US 11,770,832 B2
(45) Date of Patent: Sep. 26, 2023

(54) INFORMATION TRANSMISSION METHOD, DEVICE AND APPARATUS AND COMPUTER-READABLE STORAGE MEDIUM

(71) Applicant: ZTE CORPORATION, Guangdong (CN)

(72) Inventors: Wei Gou, Guangdong (CN); Xianghui Han, Guangdong (CN); Peng Hao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 352 days.

(21) Appl. No.: 17/264,359

(22) PCT Filed: Aug. 2, 2019

(86) PCT No.: PCT/CN2019/099025
§ 371 (c)(1),
(2) Date: Jan. 29, 2021

(87) PCT Pub. No.: WO2020/025045
PCT Pub. Date: Feb. 6, 2020

(65) Prior Publication Data
US 2021/0307046 A1   Sep. 30, 2021

(30) Foreign Application Priority Data

Aug. 2, 2018 (CN) .................. 201810871291.X

(51) Int. Cl.
*H04W 72/12* (2023.01)
*H04L 1/18* (2023.01)
(Continued)

(52) U.S. Cl.
CPC .......... *H04W 72/21* (2023.01); *H04L 1/1819* (2013.01); *H04L 1/1896* (2013.01);
(Continued)

(58) Field of Classification Search
CPC ... H04L 5/0058; H04L 5/0057; H04L 1/1819; H04L 5/0055; H04L 1/1896;
(Continued)

(56) References Cited

U.S. PATENT DOCUMENTS 11,374,712 B2 * 6/2022 Yum .................. H04B 7/0626
11,463,996 B2 * 10/2022 Choi .................... H04L 5/005
(Continued)

FOREIGN PATENT DOCUMENTS

CN   103124428 A   5/2013
CN   103516491 A   1/2014
(Continued)

OTHER PUBLICATIONS

Japan Patent Office, The first office action of the JP application dated Mar. 1, 2022.
(Continued)

*Primary Examiner* — Brian D Nguyen
(74) *Attorney, Agent, or Firm* — Li & Cai Intellectual Property (USA) Office

(57) ABSTRACT

The present disclosure provides an information transmission method, an information transmission device, an information transmission apparatus and a computer-readable storage medium. The method includes multiplexing, when a plurality of uplink physical channels exist in a time slot, information carried by the plurality of uplink physical channels to one or more first uplink physical channels; and transmitting the information through the one or more first uplink physical channels when it is determined that end positions of the one or more first uplink physical channels satisfy a constraint.

18 Claims, 6 Drawing Sheets

(51) Int. Cl.
  *H04W 72/04* (2023.01)
  *H04W 72/21* (2023.01)
  *H04L 1/1812* (2023.01)
  *H04L 1/1867* (2023.01)
  *H04W 72/0446* (2023.01)
  *H04W 72/0453* (2023.01)
  *H04W 72/1263* (2023.01)
  *H04W 72/54* (2023.01)

(52) U.S. Cl.
  CPC ... *H04W 72/0446* (2013.01); *H04W 72/0453* (2013.01); *H04W 72/1263* (2013.01); *H04W 72/54* (2023.01)

(58) Field of Classification Search
  CPC .... H04L 1/1671; H04L 5/0053; H04W 72/21; H04W 72/1263; H04W 72/0446; H04W 72/0453; H04W 72/54
  See application file for complete search history.

(56) References Cited

U.S. PATENT DOCUMENTS

| | | | |
|---|---|---|---|
| 11,601,923 B2* | 3/2023 | Chen | H04W 72/0446 |
| 2014/0226608 A1 | 8/2014 | Seo et al. | |
| 2016/0337987 A1 | 11/2016 | Yi | |
| 2018/0176871 A1 | 6/2018 | Li | |
| 2018/0219606 A1* | 8/2018 | Ng | H04W 72/0453 |
| 2018/0331875 A1* | 11/2018 | Abedini | H04W 8/245 |
| 2019/0261335 A1 | 8/2019 | Peng et al. | |
| 2019/0296877 A1* | 9/2019 | Zhang | H04L 5/0048 |
| 2020/0022117 A1* | 1/2020 | Dong | H04L 1/08 |
| 2020/0120642 A1* | 4/2020 | Hwang | H04L 5/005 |
| 2021/0243728 A1* | 8/2021 | Lee | H04W 72/56 |
| 2021/0274488 A1* | 9/2021 | Yamamoto | H04W 72/20 |
| 2021/0368528 A1* | 11/2021 | Yoshimura | H04L 1/1819 |

FOREIGN PATENT DOCUMENTS

| | | |
|---|---|---|
| CN | 105917709 A | 8/2016 |
| CN | 106067845 A | 11/2016 |
| CN | 106455103 A | 2/2017 |
| CN | 107896390 A | 4/2018 |
| CN | 108023721 A | 5/2018 |
| CN | 108347318 A | 7/2018 |
| JP | 2014531825 A | 11/2014 |
| WO | WO 2015142037 A1 | 9/2015 |

OTHER PUBLICATIONS

Catr, "Remaining issues on UCI multiplexing on PUSCH", 3GPP TSG RAN WG1Meeting #92, dated Mar. 2, 2018.
European Patent Office, The extended European search report of the EP application dated Apr. 14, 2022.
QUALCOMM, "Remaining issues for overlapping UL transmissions", 3GPP TSG RAN WG1Meeting #93, dated May 20, 2018.
Xiaomi Communications, "On Remaining issues of UCI multiplexing", 3GPP TSG RAN WG1Meeting #93, dated May 20, 2018.
WIPO, International Search Report dated Sep. 29, 2019.

* cited by examiner

INFORMATION TRANSMISSION METHOD, DEVICE AND APPARATUS AND COMPUTER-READABLE STORAGE MEDIUM

The present disclosure claims the priority of Chinese Patent Application No. 201810871291.X filed with the CNIPA on Aug. 2, 2018, the entire contents of which are incorporated herein by reference.

TECHNICAL FIELD

The present disclosure relates to, but is not limited to, the field of communications, and in particular, to a method, a device, and an apparatus for information transmission, and a computer-readable storage medium.

BACKGROUND

In the case where a plurality of uplink physical channels overlap, a resolution mechanism is usually as follows: it is first determined whether the plurality of uplink physical channels meet a timing requirement, which is that a start moment of a first symbol of the earliest physical channel in the plurality of uplink physical channels is not earlier than an end point of duration Tn (n=0, 1, 2 . . . , and denotes the different uplink physical channels) after a channel or signal corresponding to each of the plurality of uplink physical channels, Tn being the time for decoding the channel or signal corresponding to each uplink channel and the time for preparing data to be transmitted in the plurality of uplink physical channels; and, if the above timing requirement is met, all the uplink physical channels are merged into one or two uplink physical channels for transmission, in the case of being merged into two uplink physical channels, one is in a short Physical Uplink Control Channel (PUCCH) format (format 0 or format 2), and the other is in a long PUCCH format (format 1, format 3, or format 4), and the two different uplink physical channels simultaneously transmit Hybrid Automatic Repeat request-Acknowledgement (HARQ-ACK). The uplink physical channel obtained by the merging may be a new uplink physical channel, and, if so, the new uplink physical channel should meet the timing requirement determined by the original plurality of uplink physical channels.

Merging the plurality of uplink physical channels into one or two uplink physical channels is multiplexing the information carried by the plurality of uplink physical channels to one or two uplink physical channels.

However, the above resolution mechanism for the overlapping of a plurality of uplink physical channels is prone to affect the timeliness of the uplink physical channels.

SUMMARY

In order to ensure the timeliness of an uplink physical channel, the embodiments of the present disclosure provide an information transmission method, an information transmission device, an information transmission apparatus and a computer-readable storage medium.

The embodiments of the present disclosure provide an information transmission method, including: when a plurality of uplink physical channels exist in a time slot, multiplexing information carried by the plurality of uplink physical channels to one or more first uplink physical channels; and transmitting the information through the one or more first uplink physical channels when it is determined that end positions of the one or more first uplink physical channels satisfy a constraint.

The embodiments of the present disclosure further provide an information transmission device, including: a multiplexing module, which is configured to multiplex, when a plurality of uplink physical channels exist in a time slot, information carried by the plurality of uplink physical channels to one or more first uplink physical channels; and a transmission module, which is configured to transmit the information through the one or more first uplink physical channels when it is determined that end positions of the one or more first uplink physical channels satisfy a constraint.

The embodiments of the present disclosure further provide an information transmission apparatus, including a memory, a processor, and a computer program which is stored on the memory and is capable of being executed on the processor. The processor performs the above information transmission method when executing the computer program.

The embodiments of the present disclosure further provide a computer-readable storage medium having computer-executable instructions stored thereon, and the computer-executable instructions are configured to perform the above information transmission method.

BRIEF DESCRIPTION OF THE DRAWINGS

FIG. 1 is a schematic diagram illustrating a timing requirement;

FIG. 2 is a flowchart illustrating an information transmission method according to an embodiment of the present disclosure;

FIG. 3 is a schematic diagram illustrating Constraint One in Application Example 1;

FIG. 4 is a schematic diagram illustrating Constraint Two in the Application Example 1;

FIG. 5 is a schematic diagram illustrating Constraint Three in the Application Example 1;

FIG. 6 is a schematic diagram illustrating Application Example 2;

FIG. 7 is a schematic diagram illustrating Application Example 3;

FIG. 8 is a schematic diagram illustrating Example 1 in Application Example 4;

FIG. 9 is a schematic diagram illustrating Example 2 in the Application Example 4;

FIG. 10 is a schematic diagram illustrating Example 3 in the Application Example 4;

FIG. 11 is a schematic diagram illustrating Example 3 in the Application Example 4; FIG. 12 is a schematic diagram of an information transmission device according to an embodiment of the present disclosure; and FIG. 13 is a schematic diagram of an information transmission apparatus according to an embodiment of the present disclosure.

DETAILED DESCRIPTION

The embodiments of the present disclosure will be described in detail below with reference to the accompanying drawings. It should be noted that the embodiments and the features thereof in the present application can be arbitrarily combined with one another if no conflict is incurred.

The steps illustrated in the flowcharts of the drawings may be performed in a computer system such as a set of computer-executable instructions. In addition, although a logical order is illustrated in the flowchart, the steps illustrated or described may be performed in an order different from that described herein in some cases.

Figure 1:
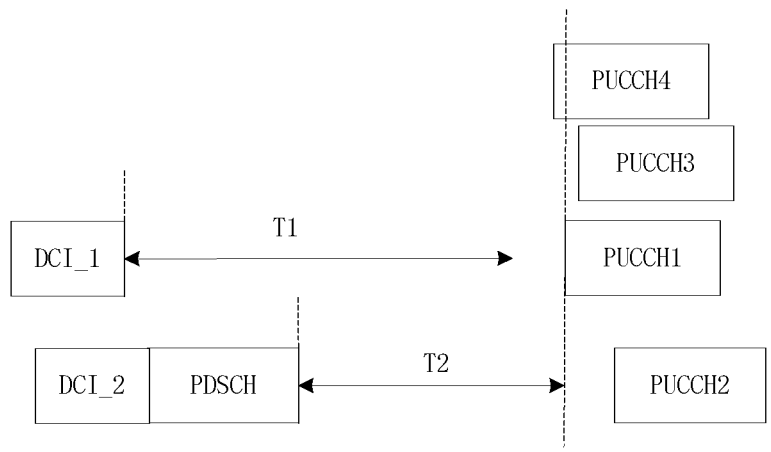

An example is illustrated by FIG. 1. Supposing that PUCCH1 and PUCCH2 overlap in a time slot in terms of time domain, a channel or signal corresponding to the PUCCH1 is Downlink Control Information (DCI)_1, and a channel or signal corresponding to the PUCCH2 is a DCI_2-scheduled Physical Uplink Shared Channel (PDSCH). T1 is the time for decoding DCI_1 and preparing the information to be transmitted in the PUCCH1, and T2 is the time for decoding the PDSCH and preparing the information to be transmitted in the PUCCH2. The timing requirement is that a start position of a first symbol of the PUCCH1 which is earlier than the PUCCH2 is not earlier than an end moment of any one of T1 and T2. The PUCCH1 and the PUCCH2 satisfy the timing requirement, so that the PUCCH1 and the PUCCH2 are merged to obtain PUCCH. Supposing that PUCCH3 is the obtained PUCCH, the PUCCH3 is also required to satisfy the timing requirement determined by the PUCCH1 and the PUCCH2, that is, a first symbol of the PUCCH3 cannot be earlier than the end moment of any one of T1 and T2 (a start moment of T1 and a start moment of T2 are an end moment of the DCI_1, and an end moment of the PDSCH respectively). It can be seen from FIG. 1 that PUCCH4 cannot serve as the PUCCH obtained by merging the PUCCH1 and the PUCCH2 because a first symbol of the PUCCH4 is earlier than the end moment of T2, that is, the PUCCH 4 does not satisfy the timing requirement determined by the PUCCH1 and the PUCCH2.

In New Radio (NR), the support for transmission of Ultra Reliable Low Latency Communication (URLLC) services is being discussed, the URLLC services have a very high requirement of transmission time, for example, a single data transmission from the arrival of the data in a transmitting end to the reception of the data by a receiving end is required to be finished within 1 ms. Meanwhile, the services require high transmission reliability and quick HARQ-ACK feedback.

Therefore, it is being discussed whether it is possible to support multiple transmissions of HARQ-ACK in one time slot (it is required in the NR that the HARQ ACK can be transmitted only once in one time slot), and the simplest solution is to configure PUCCHs for multiple transmissions of HARQ-ACK by means of time division for User Equipment (UE).

However, the existing resolution mechanism for the overlapping of a plurality of uplink physical channels is prone to delay or advance an original data transmission in a PUCCH or PUSCH of URLLC, and a timing requirement of URLLC may be affected especially when the data transmission is delayed. For example, a subsequent retransmission of URLLC is delayed than originally planned, which is likely to affect the timeliness of URLLC transmission.

The above may also occur when a plurality of uplink physical channels overlap in a time slot and include a PUCCH/PUSCH for carrying HARQ-ACK, or Channel State Information (CSI), or Scheduling Request (SR) of URLLC.

Figure 2:
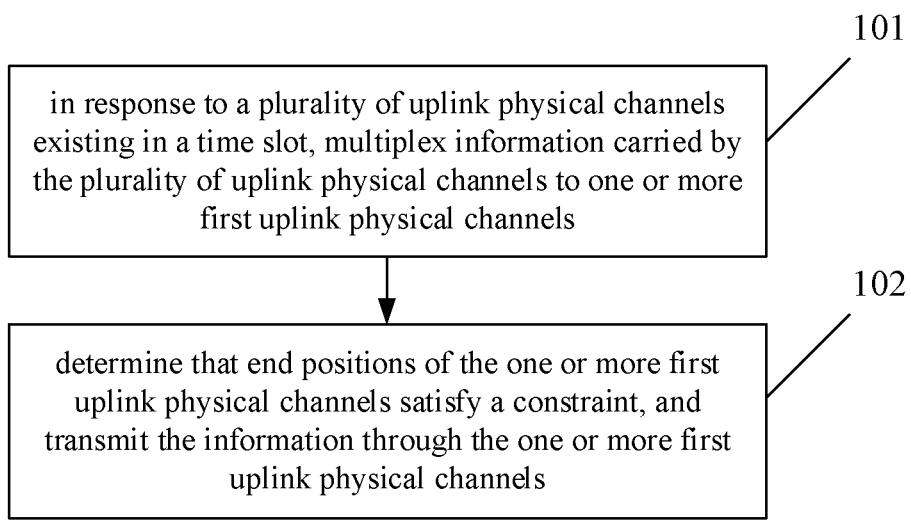

As shown in FIG. 2, an information transmission method according to an embodiment of the present disclosure includes: step 101, when a plurality of uplink physical channels exist in a time slot, multiplexing information carried by the plurality of uplink physical channels to one or more first uplink physical channels.

The plurality of uplink physical channels may include a PUCCH and/or a PUSCH.

The first uplink physical channel is an uplink physical channel obtained by multiplexing the plurality of uplink physical channels and configured to transmit information.

In one embodiment, before the step 101, the method may further include determining the existence of at least one of the following conditions: the plurality of uplink physical channels overlap in terms of time domain; or the plurality of uplink physical channels include a URLLC channel.

However, the above two conditions are not indispensable, that is, it is possible not to determine the existence of the above two conditions in the embodiments of the present disclosure, and the beneficial effects of the embodiments of the present disclosure are more significant when the plurality of uplink physical channels overlap in terms of time domain or the plurality of uplink physical channels include a URLLC channel.

In one embodiment, the step 101 may include: directly multiplexing the information carried by the plurality of uplink physical channels to the one or more first uplink physical channels, or performing multiplexing for a plurality of times, so as to multiplex the information carried by the plurality of uplink physical channels to one or more second uplink physical channels and multiplex information carried by the one or more second uplink physical channels to the one or more first uplink physical channels.

The second uplink physical channel refers to an uplink physical channel obtained during the multiplexing processes, and the second uplink physical channels are multiplexed, or the second uplink physical channels and one or more of the plurality of original uplink physical channels are multiplexed, so as to obtain the first uplink physical channel.

In one embodiment, the plurality of uplink physical channels include a plurality of PUCCHs, and multiplexing the information carried by the plurality of uplink physical channels to the one or more first uplink physical channels can be achieved with at least one of the following methods:

(1) preferentially multiplexing the PUCCHs carrying the same type of Uplink Control Information (UCI); or (2) multiplexing the plurality of PUCCHs in a two-by-two multiplexing way.

For example, among the plurality of uplink physical channels, the PUCCHs carrying HARQ-ACK are multiplexed to obtain one PUCCH, and then the obtained PUCCH and the other uplink physical channels are multiplexed if the obtained PUCCH and the other uplink physical channels overlap in terms of time domain; but if the obtained PUCCH and the other uplink physical channels do not overlap in terms of time domain, the PUCCH and the other uplink physical channels are not multiplexed.

The other uplink physical channels mentioned above may include at least one of a PUCCH or a PUSCH, which carry other types of UCI. The PUCCH which carries the other types of UCI may be one or more of the plurality of uplink physical channels, or may be a PUCCH (i.e. the second uplink physical channel) obtained by multiplexing the PUCCHs carrying the other types of UCI (e.g. PUCCHs of CSI or PUCCHs of SR).

When the PUCCHs carrying HARQ-ACK (or the PUCCHs carrying a different type of UCI) are multiplexed, the multiplexing is carried out in a two-by-two multiplexing way. The two-by-two multiplexing way is to select two PUCCHs, which are the earliest in time, from the PUCCHs to be multiplexed and multiplexing the selected two UPCCHs, to further screen, if more than two PUCCHs are selected according to the earliest-in-time principle, the selected PUCCHs according to a symbol-number principle (for example, the PUCCH having the most symbols is preferentially selected), to further screen, if more than two PUCCHs are selected according to the symbol-number principle, the selected PUCCHs according to frequency domain positions of the PUCCHs (for example, a PUCCH is preferentially selected if an index of physical resource block (RB) corresponding to a frequency domain position of the PUCCH is smaller), and to finally select and multiplex two PUCCHs. Optionally, it is determined whether the selected two PUCCHs overlap in terms of time domain before the multiplexing is performed, and if so, the multiplexing is performed to obtain a PUCCH, and the obtained PUCCH and the remaining PUCCHs are taken as new to-be-multiplexed PUCCHs and are further multiplexed according to the above principles; otherwise, the selected two PUCCHs are not multiplexed, the earlier one in the selected two PUCCHs is not taken as a to-be-multiplexed PUCCH, while the later one in the selected two PUCCHs and the remaining PUCCHs are taken as new to-be-multiplexed PUCCHs and are further multiplexed according to the above principles, and so on.

In one embodiment, the plurality of uplink physical channels include a plurality of PUCCHs, and the step of multiplexing the information carried by the plurality of uplink physical channels to the one or more first uplink physical channels includes: concatenating UCI of the PUCCHs carrying the same type of UCI; and concatenating the obtained UCI according to UCI types.

In this embodiment, the to-be-multiplexed PUCCHs are multiplexed uniformly. The bits of the same type of UCI are firstly concatenated, and then the UCI of different types obtained by the concatenation is further concatenated in order of UCI type. The order may be HARQ-ACK bits, SR bits (if any), and CSI bits (if any).

The concatenation of the UCI of the PUCCHs carrying the same type of UCI can be performed using three dimensions (priority orders): in order of time of PUCCH, in order of symbol number of PUCCH, and in order of frequency domain position of PUCCH.

In this way, PUCCH resource can be determined at one time with a simple process.

For example, the concatenation of the UCI of the PUCCHs carrying the same type of UCI is performed in order of time, then in order of symbol number of PUCCH, and then in order of frequency domain position of PUCCH (if frequency hopping occurs in a frequency domain of a PUCCH, a frequency domain position where the frequency hopping first occurs is taken as the frequency domain position of the PUCCH) (the above orders in which the concatenation of UCI is performed may only be applied to certain types of UCI, such as HARQ-ACK, but not be applied to the other types of UCI). For example, the concatenation of the UCI of the PUCCHs carrying the same type of UCI can also be performed in another way, such as in order of frequency domain position of PUCCH, then in order of time, and then in order of symbol number of PUCCH.

Furthermore, in addition to the above multiplexing methods, the PUCCHs when overlapping can be multiplexed with the following multiplexing method in some specific cases:

for example, when PUCCH2 (in format 1) carrying HARQ-ACK and PUCCH3 (in format 2, format 3 or format 4) carrying HARQ-ACK are multiplexed by time-division multiplexing (the PUCCH 2 is earlier than the PUCCH 3 in time) in a time slot, and meanwhile the PUCCH2 and PUCCH3 carrying SR or CSI overlap in the time slot in terms of time domain, a base station and UE agree to implement the following multiplexing method (supposing that the above timing mechanism is satisfied): to multiplex the PUCCH1 and the PUCCH3 to obtain a PUCCH, determine whether the obtained PUCCH and the PUCCH2 overlap in terms of time domain, and if so, multiplex the obtained PUCCH and the PUCCH2, otherwise, use both the PUCCH2 and the obtained PUCCH for transmission. The multiplexing method can also be described as follows: to first multiplex the PUCCH carrying SR or CSI and the PUCCH in format 2/format 3/format 4 (the order of the PUCCH2 and the PUCCH3 is not limited here) to obtain a PUCCH, then determine whether the obtained PUCCH and the PUCCH in format 1 overlap in terms of time domain, and if so, multiplex the obtained PUCCH and the PUCCH in format 1, otherwise, respectively transmit the obtained PUCCH and the PUCCH in format 1. The later description of the multiplexing method can be applied more widely.

In those specific cases, the above multiplexing method is more efficient. If the "two-by-two multiplexing" mechanism is used alone, it is very probable that the PUCCH3 is dropped or is not multiplexed.

In addition, in the case where the plurality of uplink physical channels include a PUCCH and a PUSCH, the uplink physical channels can be multiplexed using an existing mechanism, which is directly multiplexing the information carried by the PUCCH to the PUSCH.

The method further includes step 102: determining that end positions of the one or more first uplink physical channels satisfy a constraint, and transmitting the information through the one or more first uplink physical channels.

In one embodiment, the constraint satisfied by the end positions of the one or more first uplink physical channels includes at least one of the following constraints: the end positions of the one or more first uplink physical channels are not later than a latest end position of the plurality of uplink physical channels; the plurality of uplink physical channels includes a URLLC channel, and the end positions of the one or more first uplink physical channels are not later than a latest end position of the URLLC channel; or the plurality of uplink physical channels include a URLLC channel, and an interval exists between the end positions of the one or more first uplink physical channels and a transmission of a subsequent channel or subsequent signal of the URLLC channel, and the interval includes duration of decoding of a corresponding first uplink physical channel and duration of preparation of data to be transmitted through the subsequent channel or subsequent signal.

A transmission location of the subsequent channel or subsequent signal is determined according to a location of the URLLC channel.

In the embodiments of the present disclosure, by making the end position of the first uplink physical channel satisfy the constraint, the timeliness of the uplink physical channel is ensured, which allows a more compact and efficient time sequence.

In addition, the one or more first uplink physical channels may also be required to meet the above timing requirement.

In one embodiment, the method further includes determining that end positions of the one or more second uplink physical channels satisfy the constraint.

That is, the second uplink physical channel obtained in the multiplexing processes is also required to satisfy the constraints, which are:

the end positions of the one or more second uplink physical channels are not later than a latest end position of the plurality of uplink physical channels;

the plurality of uplink physical channels includes a URLLC channel, and the end positions of the one or more second uplink physical channels are not later than a latest end position of the URLLC channel; and/or the plurality of uplink physical channels include a URLLC channel, and an interval between the end positions of the one or more second uplink physical channels and a transmission of a subsequent channel or subsequent signal of the URLLC channel includes duration of decoding of a corresponding second uplink physical channel and preparation of data to be transmitted through the subsequent channel or subsequent signal.

The information transmission method provided by the embodiments of the present disclosure can be applied to UE and a base station, which mutually agree on a multiplexing method and a constraint, and the UE multiplexes a plurality of uplink physical channels with the multiplexing method, and transmits information to the base station through an obtained first uplink physical channel when an end position of the obtained first uplink physical channel satisfies the constraint; and the base station determines a location of the first uplink physical channel with the multiplexing method, and receives the information according to the location of the first uplink physical channel when the end position of the first uplink physical channel satisfies the constraint. The implementation of the method is illustrated by the following application examples, in which the multiplexing of channels is referred to as merging.

Application Example 1

The Application Example 1 relates to an enhancement to the original timing requirement, with three specific enhancements (constraints) being presented.

A plurality of uplink physical channels (including a PUCCH and/or a PUSCH) overlap in a time slot in terms of time domain (or a plurality of uplink physical channels which do not overlap in a time slot in terms of time domain), and a first symbol of an earliest uplink physical channel in the plurality of uplink physical channels is not earlier than an end moment of Tn (n=1, 2, 3 . . . , and corresponds to one of the plurality of uplink physical channels). Tn is the time for processing a channel or signal corresponding to each of the plurality of physical uplink channels and the time required for preparing data for each of the plurality of physical uplink channels (Tn may further includes the time required for other processing, as long as the principle determined by the timing requirement is not affected). A start of Tn is an end position of the channel or signal corresponding to each of the plurality of uplink physical channels. When the plurality of uplink physical channels meet the timing requirement, the plurality of uplink physical channels are merged to obtain a first uplink physical channel, and the obtained first uplink physical channel may meet the timing requirement determined by the plurality of uplink physical channels, or may not.

The first uplink physical channel satisfies one or more of the following four constraints.

Constraint One: end positions of the one or more first uplink physical channels are not later than a latest end position of the plurality of uplink physical channels.

Figure 3:
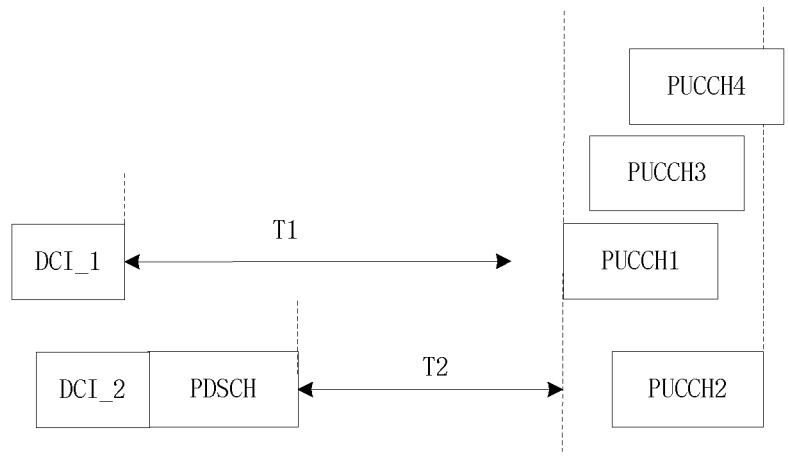

With reference to FIG. 3, supposing that PUCCH1 and PUCCH2 overlap in a time slot in terms of time domain (the PUCCH 1 and the PUCCH2 represent the above-mentioned plurality of uplink physical channels, and it is also possible that the PUCCH1 and the PUCCH2 are time-divided and do not overlap in terms of time domain), a channel or signal corresponding to the PUCCH1 is DCI_1, and a channel or signal corresponding to the PUCCH2 is a DCI_2-scheduled PDSCH. T1 is the time for decoding DCI_1 and preparing the information to be transmitted in the PUCCH1, and T2 is the time for decoding the PDSCH and preparing the information to be transmitted in the PUCCH2. A start position of a first symbol of the PUCCH1 which is earlier than the PUCCH2 is not earlier than an end moment of any one of T1 and T2. Therefore, the PUCCH1 and the PUCCH2 satisfy the timing requirement, and are merged to obtain a PUCCH. Supposing that PUCCH3 is the obtained PUCCH, the PUCCH3 is also required to satisfy the timing requirement determined by the PUCCH1 and the PUCCH2, that is, a first symbol of the PUCCH3 cannot be earlier than the end moment of any one of T1 and T2. It can be seen from FIG. 3 that PUCCH4 cannot serve as the PUCCH obtained by merging the PUCCH1 and the PUCCH2, because an end position of the PUCCH4 is later than that of the PUCCH2.

Constraint Two: the plurality of uplink physical channels includes a URLLC channel, and the end positions of the one or more first uplink physical channels are not later than a latest end position of the URLLC channel.

The Constraint Two introduces a case that the plurality of uplink physical channels include an uplink physical channel of URLLC. Such case is introduced because the technical solutions provided by the present disclosure are more advantageous and can produce more gains when applied to URLLC services. It can also be interpreted in such a way that the UE adopts the method provided by the embodiments of the present disclosure when a plurality of uplink physical channels include an uplink physical channel of URLLC, and adopts an existing method when the plurality of uplink physical channels do not include an uplink physical channel of URLLC. That is, the present disclosure proposes that the base station and the UE determine a corresponding solution according to service types corresponding to the plurality of uplink physical channels.

Figure 4:
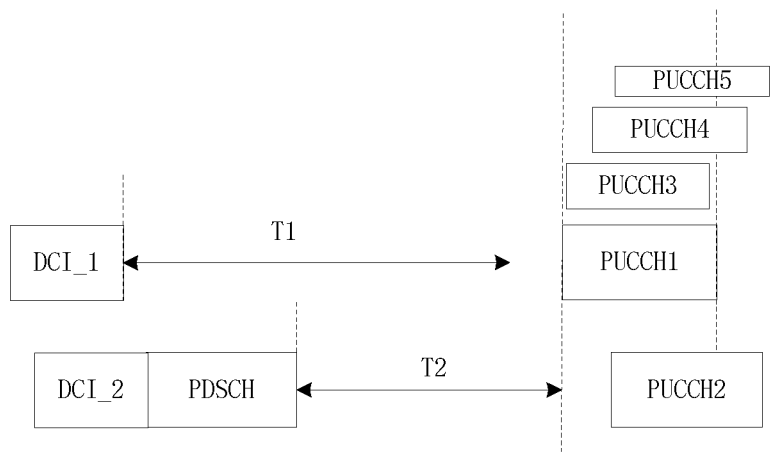

With reference to FIG. 4, supposing that PUCCH1 is for a URLLC service, similar to FIG. 1, an end position of an uplink physical channel obtained after merging the PUCCH1 and PUCCH2 is not later than that of the PUCCH1 (the PUCCH1 is related to URLLC, if more than one uplink physical channel is for a URLLC service, the uplink physical channel of URLLC whose end position is the latest is selected as the PUCCH1). An end position of PUCCH3 is not later than that of the PUCCH1, so that the PUCCH3 meets the requirement (if the Constraint One is taken into consideration, both the PUCCH3 and PUCCH4 meet the requirement, and if the existing method is adopted, the PUCCH3, the PUCCH4 and PUCCH5 all meet the requirement).

Constraint Three: the plurality of uplink physical channels include a URLLC channel, an interval between end positions of the one or more first uplink physical channels and a transmission of a subsequent channel or subsequent signal of the URLLC channel is J, which includes duration of decoding of a corresponding first uplink physical channel and preparation of data to be transmitted through the subsequent channel or subsequent signal. That is, within the interval J, the corresponding first uplink physical channel can be decoded and the data to be transmitted through the subsequent relevant channel or signal can be prepared. A transmission location of the subsequent channel or subsequent signal is determined according to a location of the URLLC channel.

Figure 5:
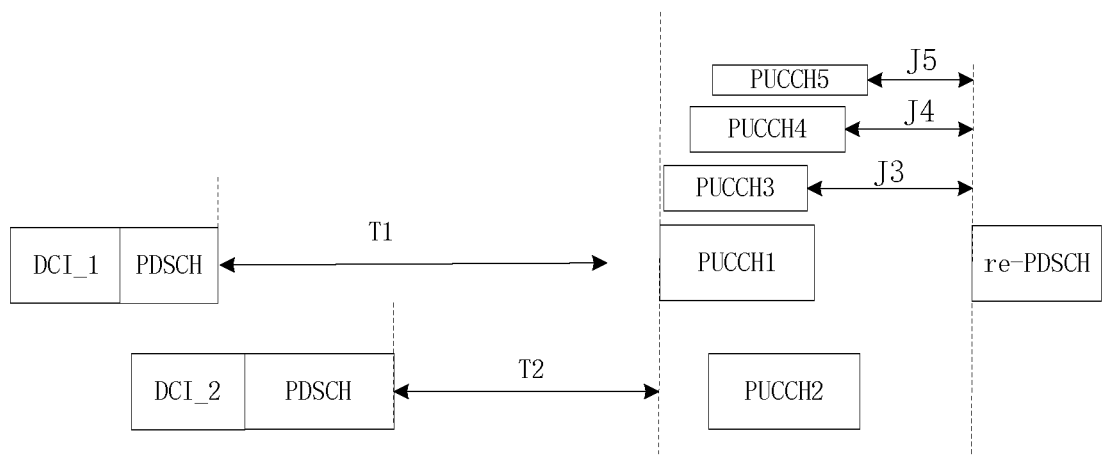

With reference to FIG. 5, supposing that PUCCH1 in the plurality of uplink physical channels (i.e. PUCCH1 and PUCCH 2) is for a URLLC service, and that a subsequent relevant channel or signal of the PUCCH1 is re-PDSCH shown in FIG. 5 (the re-PDSCH indicates a retransmission of a previous PDSCH, that is, the base station retransmits a PDSCH at the position of re-PDSCH if the PUCCH1 feeds back Negative Acknowledgement (NACK)). The position of the re-PDSCH is related to an end moment of a transmission of the PUCCH1. According to different UE capabilities and timing requirements of URLLC, a timing position arranged for the UE by the base station may not allowed to move back and forth in some cases, and a time sequence of URLLC may fail to meet a requirement of transmission timeliness if the timing position is moved back or forth. For example, as shown in FIG. 5, the re-PDSCH is originally arranged according to the end position of the PUCCH1 (that is, within an interval between the end position of the PUCCH1 and the re-PDSCH, the base station can finish decoding the PUCCH1 and preparing data for the re-PDSCH. If the base station prepares the data for the re-PDSCH in advance, the time for the data preparation can be ignored); if PUCCH5 is taken as a first uplink physical channel and the base station cannot finish decoding the PUCCH5 and preparing data for the re-PDSCH within the shorter interval between the PUCCH5 and the originally arranged re-PDSCH, a transmission of the re-PDSCH is delayed, which affects the timeliness of URLLC. Thus, the PUCCH5 cannot be selected as the PUCCH determined after merging the plurality of uplink physical channels.

Therefore, similar to FIG. 1, an interval between the end position of the uplink physical channel determined after merging the PUCCH1 and the PUCCH2 and a subsequent relevant channel or signal of the PUCCH1 is J, and at least the decoding of the PUCCH1 and the data preparation for the re-PDSCH must be completed within the interval J. In such case, the determined uplink physical channel is appropriate. If the Constraint Three is taken into consideration, PUCCH3 shown in FIG. 5 can certainly meet the requirement, because an interval between the PUCCH3 and the re-PDSCH shown in FIG. 5 is longer than that between the PUCCH1 and the re-PDSCH, which ensures enough time for data preparation. It is possible that PUCCH4 shown in FIG. 5 can meet the requirement, and whether the PUCCH4 can meet the requirement depends on whether data preparation can be finished within an interval between the PUCCH4 and the re-PDSCH, and can be determined according to the processing capability of apparatus.

A requirement of transmission timeliness of a service is considered, for example, a time limit is set for a process from the beginning of a transmission of PDSCH of a service to the correct reception by the UE (in the case where a PDSCH transmitted for the first time is incorrectly decoded by the UE, the time limit is set for the process of first transmission of the PDSCH, incorrect decoding by the UE, sending of NACK feedback from the UE, retransmission of the PDSCH by the base station, and correct decoding of the retransmitted PDSCH by the UE). Supposing the time limit is M which can be determined according to the requirement of the service, after the PDSCH is transmitted, a latest start position of re-PDSCH can be derived from M according to the Constraint Three if a PUCCH corresponding to the PDSCH feeds back NACK, so that an end position of J can be determined (the end position of J is the start position of the re-PDSCH).

Constraint Four: Constraint Four is looser than the Constraint Three. The Constraint Four allows that the UE receives a possible re-PDSCH immediately after sending a PUCCH1 carrying ACK/NACK, and correspondingly allows that the base station directly transmits re-PDSCH to the UE before actually decoding the received PUCCH1 carrying ACK/NACK. That is, the UE may receive the re-PDSCH sent by the base station immediately after sending the PUCCH1 carrying ACK/NACK; or, the UE cannot receive the re-PDSCH before finishing sending the PUCCH1 carrying ACK/NACK; or, the base station is not allowed to send the re-PDSCH before the UE finishes sending the PUCCH1 carrying ACK/NACK. The Constraint Four actually allows J described in the Constraint Three to be Jmin (Jmin is the duration close to 0, and can include the time for the UE to switch from uplink transmission to downlink reception. That is, the base station directly sends the re-PDSCH when the base station determines that the transmission of the PUCCH1 carrying ACK/NACK by the UE is finished, and the data of the re-PDSCH can be prepared in advance, that is, the base station can, when planning to send the re-PDSCH this way, prepare the data for the re-PDSCH in advance so as to send the re-PDSCH after the transmission of the PUCCH1 carrying ACK/NACK by the UE is finished), but the Constraint Four does not allow J to be a negative number, because an end position of a PUCCH determined by merging is later than a start position of the re-PDSCH if J is a negative number.

Similarly, the requirement of transmission timeliness of a service should be considered, for example, a time limit is set for a process from the beginning of a transmission of PDSCH of a service to the correct reception by the UE (in the case where a PDSCH transmitted for the first time is incorrectly decoded by the UE, the time limit is set for the process of first transmission of the PDSCH, incorrect decoding by the UE, sending of NACK feedback from the UE, retransmission of the PDSCH by the base station, and correct decoding of the retransmitted PDSCH by the UE). Supposing the time limit is M which can be determined according to the requirement of the service, after the PDSCH is transmitted, a latest start position of re-PDSCH can be derived from M according to the Constraint Four if a PUCCH corresponding to the PDSCH feeds back NACK, so that an end position of J can be determined (the end position of J is the start position of the re-PDSCH).

The above application example illustrates that an end position of the first uplink physical channel meets the constraints. In other examples, an end position of the second uplink physical channel should also meet the constraints, which is not described herein.

Application Example 2

A way of merging a plurality of uplink physical channels when the constraints are satisfied is mainly illustrated by the Application Example 2.

When a plurality of PUCCH resources exist in a time slot (it is not compulsory that the PUCCH resources overlap in terms of time domain, because it is possible that time-division PUCCHs carrying HARQ-ACK exist in a time slot for URLLC), the plurality of PUCCHs are merged with at least one of the following methods (which can also be used together):

Method A: merging the PUCCHs carrying the same type of UCI to obtain a PUCCH, and then merging the obtained PUCCH with the other PUCCHs; and Method B: merging the PUCCHs according to a "two-by-two merging" mechanism. The "two-by-two merging" mechanism is to select two PUCCHs, which are the earliest in time, from the PUCCHs to be merged and merge the selected two UPCCHs, to further screen, if more than two PUCCHs are selected according to the earliest-in-time principle, the selected PUCCHs according to a symbol-number principle (for example, the PUCCH having the most symbols is preferentially selected), to further screen, if more than two PUCCHs are selected according to the symbol-number principle, the selected PUCCHs according to frequency domain positions of the PUCCHs (for example, a PUCCH is preferentially selected if an index of physical resource block (RB) corresponding to a frequency domain position of the PUCCH is smaller), and to finally select and multiplex two PUCCHs. Optionally, it is determined whether the selected two PUCCHs overlap in terms of time domain before the merging process is performed, and if so, the merging process is performed to obtain a PUCCH, and the obtained PUCCH and the remaining PUCCHs are taken as new to-be-merged PUCCHs and are further merged according to the above principles; otherwise, the selected two PUCCHs are not merged, the earlier one in the selected two PUCCHs is not taken as a to-be-merged PUCCH, while the later one in the selected two PUCCHs and the remaining PUCCHs are taken as new to-be-merged PUCCHs and are further merged according to the above principles.

Figure 6:
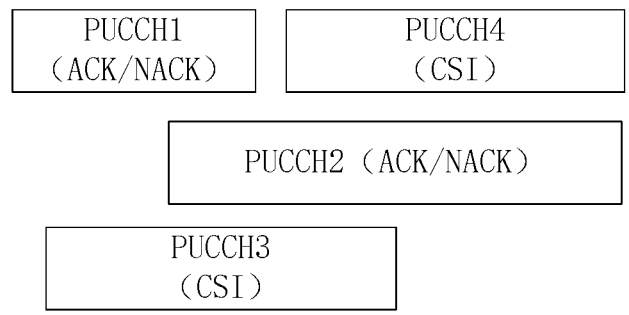

With reference to FIG. 6, when four PUCCHs are to be merged, the PUCCHs carrying the same type of UCI are preferentially merged, for example, both PUCCH1 and PUCCH2 carry ACK/NACK, so that the PUCCH1 and the PUCCH2 are merged into one PUCCH, and the obtained PUCCH may be a PUCCH resource indicated for UE in DCI. That is, the UCI in the PUCCH1 and that in the PUCCH2 are concatenated, a PUCCH set is determined according to the number of bits of the new UCI, and then the determined PUCCH set is searched according to the PUCCH resource information indicated in the DCI. The merging process is performed according to the above "two-by-two merging" principle, that is, as shown in FIG. 6, the UCI of the PUCCH1 is placed before the UCI of PUCCH2 in the concatenation. Both PUCCH3 and PUCCH4 carry CSI, and can be merged according to the "two-by-two merging" principle, or according to another principle, such as according to the priority of the carried CSI. Finally, if the PUCCH obtained by merging the PUCCH1 and the PUCCH2 and a PUCCH obtained by merging the PUCCH3 and the PUCCH4 still overlap, the two PUCCHs are further merged; otherwise, the two PUCCHs are transmitted separately.

With reference to FIG. 6, it is possible that only the PUCCHs carrying HARQ-ACK are merged to obtain a determined PUCCH, and then the determined PUCCH and the PUCCHs carrying other types of UCI are processed according to the related art (please refer to 3GPP TS38.213vf20).

Application Example 3

A way of merging a plurality of uplink physical channels when the constraints are satisfied is mainly illustrated by the Application Example 3.

The to-be-multiplexed PUCCHs are merged uniformly, which includes first concatenating the bits of the same type of UCI, and then concatenating the UCI of different types obtained by the concatenation in order of UCI type. The order in which the UCI of different types obtained by the concatenation are concatenated is HARQ-ACK bits, then SR bits (if any), and then CSI bits (if any). The concatenation of the UCI of the PUCCHs carrying the same type of UCI can be performed using three dimensions: in order of time of PUCCH, in order of symbol number of PUCCH, and in order of frequency domain position of PUCCH. For example, the concatenation of the UCI of the PUCCHs carrying the same type of UCI is performed in order of time, then in order of symbol number of PUCCH, and then in order of frequency domain position of PUCCH (if frequency hopping occurs in a frequency domain of a PUCCH, and a frequency domain position where the frequency hopping first occurs is taken as the frequency domain position of the PUCCH)(the above orders may only be applied to certain types of UCI, such as HARQ-ACK, but not be applied to the other types of UCI). For example, the concatenation of the UCI of the PUCCHs carrying the same type of UCI can also be performed in another way, such as in order of frequency domain position of PUCCH, then in order of time, and then in order of symbol number of PUCCH.

Figure 7:
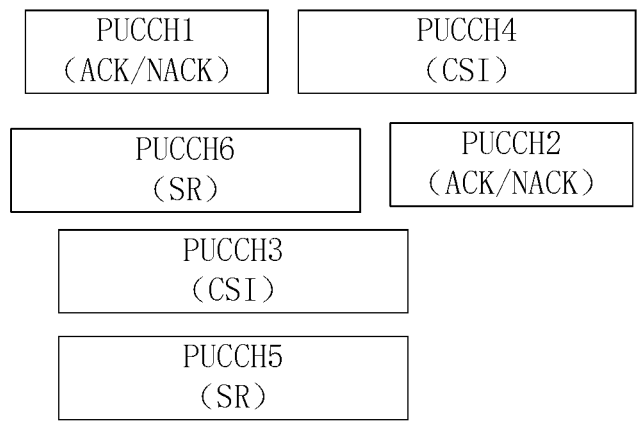

With reference to FIG. 7, if it is determined that the six PUCCHs shown in FIG. 7 are to be merged, the merging process thereof according to the present embodiment is:

ACK/NACK (also referred to as HARQ-ACK) in PUCCH1 and ACK/NACK in PUCCH2 are first concatenated in order of time, then in order of symbol number, and then in order of frequency domain position. So, the ACK/NACK of the PUCCH1 is placed before the ACK/NACK of the PUCCH2 in the concatenation to obtain concatenated ACK/NACK. Then, SR in PUCCH5 and SR in PUCCH6 are concatenated in the same way as the concatenation of ACK/NACK. Then CSI in PUCCH3 and CSI in PUCCH4 are concatenated in the same way as the concatenation of ACK/NACK. Then, the concatenation result of ACK/NACK, the concatenation result of SR and the concatenation result of CSI are concatenated in order of ACK/NACK, SR and CSI. In this case, it is not compulsory that UCI of each type is concatenated with the above concatenation method, that is, for example, the PUCCH1 and the PUCCH2 carrying ACK/NACK are concatenated with the above concatenation method, while the two PUCCHs carrying SR are concatenated with another concatenation method, the PUCCHs carrying CSI are also concatenated with another concatenation method, and then the concatenation result of ACK/NACK, the concatenation result of SR, and the concatenation result of CSI are concatenated in order of ACK/NACK, SR, and CSI.

The finally obtained UCI is transmitted through a PUCCH, which is determined by determining a PUCCH set according to the number of bits of the finally obtained UCI and then searching the PUCCH set according to PUCCH resource information indicated in DCI. In this way, it is unnecessary to determine a PUCCH resource after the concatenation of every type of UCI, and the PUCCH resource is determined once after the final concatenation, which simplifies the process.

Application Example 4

Some special principles are given in this application example for a merging mechanism.

Due to the characteristics of URLLC services, a case that two PUCCHs carrying HARQ-ACK exist in one time slot will be introduced (no matter whether the two PUCCHs overlap in terms of time domain). A merging mechanism in the related art can be generally used, but may cause a merging problem in some cases.

Example 1

Figure 8:
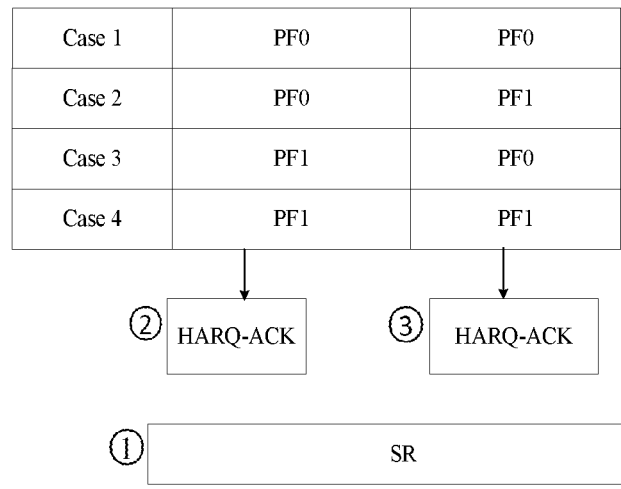

FIG. 8 illustrates a collision mechanism between a Short/long PUCCH carrying SR and a plurality of 1 or 2 bit HARQ-ACK PUCCHs (a short PUCCH is denoted by PF0 or PF2, and a long PUCCH is denoted by PF1, PF3, or PF4). With reference to FIG. 8, in Case 1 and Case 2, the SR can be transmitted through No. 2 PUCCH according to the merging mechanism in the related art, that is, no collision occurs between a PUCCH obtained by merging and No. 3 PUCCH, in which case no problem is caused.

However, there are problems in Case 3 and Case 4, because a result of merging No. 1 PUCCH (denoted by ① in FIG. 8) with No. 2 PUCCH (denoted by ② in FIG. 8) is that the HARQ-ACK can be sent through the No. 1 PUCCH if the SR is positive SR, but further merging with No. 3 PUCCH cannot be performed using the existing mechanism. In the Case 3 and the Case 4, one of the following merging schemes can be adopted.

Scheme 1: all of the numbered HARQ-ACK and the numbered SR are jointly coded, a corresponding resource set is selected according to the number of bits of the finally obtained UCI, and a transmission is carried out according to a PUCCH resource indicated in DCI. The disadvantage of this scheme is that a transmission of No. 2 HARQ-ACK may be delayed. However, if the above timing requirement is met, the delay of the transmission of No. 2 HARQ-ACK will not affect following transmissions of subsequent data.

Scheme 2: the No. 1 PUCCH and the No. 2 PUCCH are merged, but the positive SR and the HARQ-ACK are sent using a time domain resource of the HARQ-ACK and a code domain resource of the SR. Such merging process is different from the merging mechanism in the related art.

Scheme 3: in the Case 3, the No. 1 PUCCH and the No. 3 PUCCH are merged first, a PUCCH obtained by such merging process is the No. 3 PUCCH, and no collision occurs. Additionally, the merging rule needs to be set as that, if an HARQ-ACK PUCCH in collision with the PUCCH carrying SR is in Format 0, the PUCCH carrying SR is first merged with the HARQ-ACK PUCCH in Format 0; if a collision occurs between the PUCCH carrying SR and a plurality of HARQ-ACK PUCCHs in Format 0, the PUCCH carrying SR is merged with the PUCCHs in order of PUCCH number. In the Case 4, when two long HARQ-ACK PUCCHs and a PUCCH carrying SR overlap, the PUCCH carrying SR is dropped.

Scheme 4: in the Case 3 and the Case 4, the PUCCH carrying SR is dropped. In those two cases, the PUCCH carrying SR is a long PUCCH, and thus can be dropped.

Example 2

Figure 9:
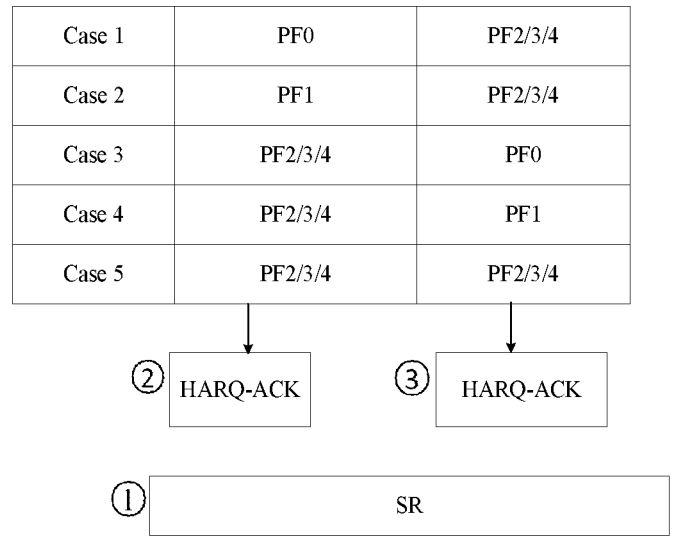

FIG. 9 illustrates a collision mechanism between a Short/long PUCCH carrying SR and at least one PUCCH carrying HARQ-ACK of more than 2 bits.

Except for Case 2, a merging process can be performed in the other cases according to the merging mechanism in the related art, without causing any problem. The merging mechanism in the related art cannot be used for merging in the Case 2. One of the following schemes can be adopted in the Case 2.

Scheme 5: the Scheme 1 in the Example 1 is adopted.

Scheme 6: the PUCCH carrying SR is dropped if the PUCCH carrying SR is a long PUCCH. No. 2 PUCCH and No. 3 PUCCH can be transmitted separately.

Scheme 7: the UCI of the No. 1 PUCCH and the UCI of the No. 2 PUCCH are jointly coded, a corresponding resource set is selected according to the number of bits of the finally obtained UCI, and a transmission is carried out according to a PUCCH resource indicated in DCI. Then it is determined whether the obtained PUCCH and the No. 3 PUCCH are further merged (merging the obtained PUCCH and the No. 3 PUCCH if the obtained PUCCH and the No. 3 PUCCH overlap).

Scheme 8: the Scheme 1 in the Example 1 is adopted if the PUCCH carrying SR is a short PUCCH. The PUCCH carrying SR is dropped if the PUCCH carrying SR is a long PUCCH, and the No. 2 PUCCH and the No. 3 PUCCH can be transmitted separately.

Scheme 9: the PUCCH carrying SR is first merged with the No. 3 PUCCH (i.e. PF 2/3/4), and the obtained PUCCH is then merged with the No. 2 PUCCH if the obtained PUCCH and the No. 2 PUCCH overlap, otherwise, the obtained PUCCH and the No. 2 PUCCH are transmitted separately.

Example 3

Figure 10:
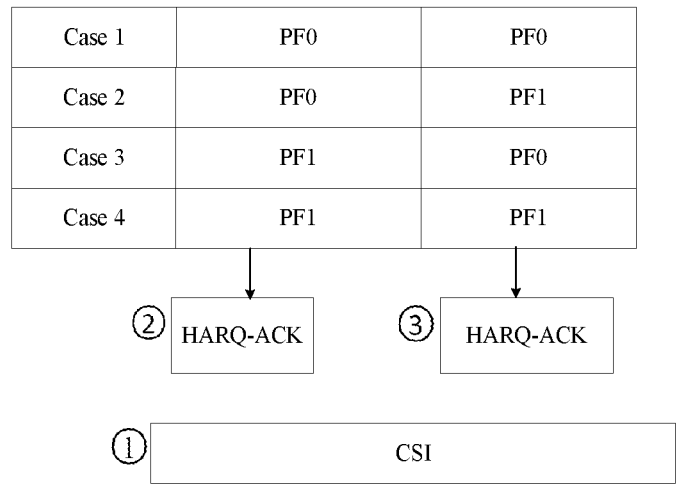
Figure 11:
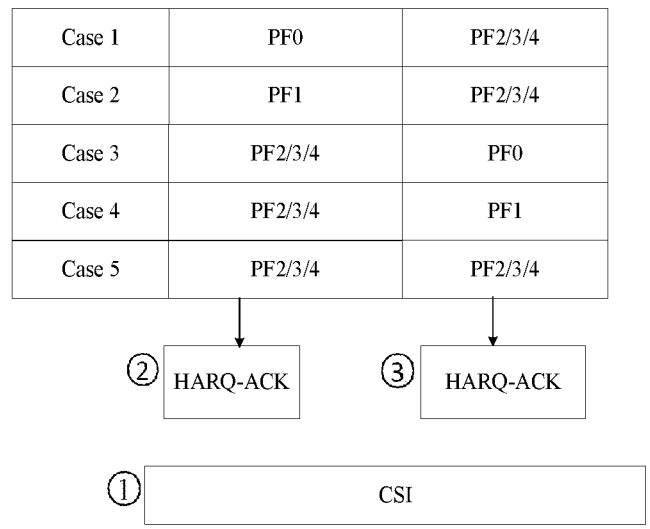

With reference to FIGS. 10 and 11, a Short/long PUCCH carrying CSI is merged with a plurality of 1 or 2 bit HARQ-ACK PUCCHs with one of the following schemes.

Scheme 10: the CSI is placed in No. 2 PUCCH carrying HARQ-ACK, the CSI and the HARQ-ACK in the No. 2 PUCCH are jointly coded, and a length of the PUCCH used after the joint coding is always kept unchanged or is not increased. Or, a base station ensures that a new PUCCH selected by the base station does not collide with a following PUCCH.

Scheme 11: the PUCCH carrying CSI is dropped, and the No. 2 PUCCH and No. 3 PUCCH are directly transmitted.

Figure 12:
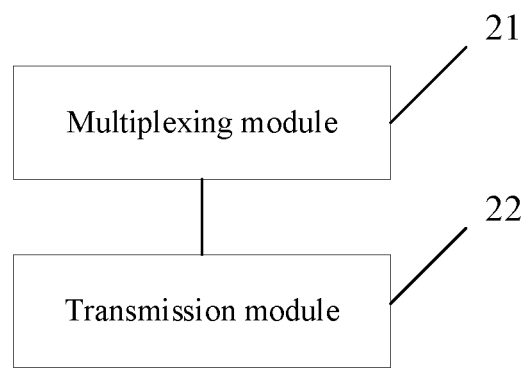

As shown in FIG. 12, the embodiments of the present disclosure further provide an information transmission device, including: a multiplexing module 21, which is configured to multiplex, when a plurality of uplink physical channels exist in a time slot, information carried by the plurality of uplink physical channels to one or more first uplink physical channels; and a transmission module 22, which is configured to determine that end positions of the one or more first uplink physical channels satisfy a constraint, and transmit the information through the one or more first uplink physical channels.

In one embodiment, the multiplexing module 21 is configured to multiplex the information carried by the plurality of uplink physical channels to the one or more first physical channels when determining the existence of at least one of the following conditions: the plurality of uplink physical channels overlap in terms of time domain; or the plurality of uplink physical channels include a URLLC channel.

In one embodiment, the transmission module 22 is configured to determine that the end positions of the one or more first uplink physical channels satisfy the constraint according to at least one of the following constraints: the end positions of the one or more first uplink physical channels are not later than a latest end position of the plurality of uplink physical channels; the plurality of uplink physical channels includes a URLLC channel, and the end positions of the one or more first uplink physical channels are not later than a latest end position of the URLLC channel; or the plurality of uplink physical channels include a URLLC channel, and an interval exists between the end positions of the one or more first uplink physical channels and a transmission of a subsequent channel or subsequent signal of the URLLC channel, and the interval includes duration of decoding of a corresponding first uplink physical channel and duration of preparation of data to be transmitted through the subsequent channel or subsequent signal.

In one embodiment, the multiplexing module 21 is configured to: directly multiplex the information carried by the plurality of uplink physical channels to the one or more first uplink physical channels, or perform multiplexing for a plurality of times, so as to multiplex the information carried by the plurality of uplink physical channels to one or more second uplink physical channels and multiplex information carried by the one or more second uplink physical channels to the one or more first uplink physical channels.

In one embodiment, the multiplexing module 21 is further configured to determine that end positions of the one or more second uplink physical channels satisfy the constraint.

In one embodiment, the plurality of uplink physical channels include a plurality of PUCCHs, and the multiplexing module 21 is configured to multiplex the information carried by the plurality of uplink physical channels to the one or more first uplink physical channels with at least one of the following methods: preferentially multiplexing the PUCCHs carrying the same type of UCI; or multiplexing the plurality of PUCCHs in a two-by-two multiplexing way.

In one embodiment, the plurality of uplink physical channels include a plurality of PUCCHs, and the multiplexing module 21 is configured to: concatenate UCI of the PUCCHs carrying the same type of UCI, and concatenate the obtained UCI according to UCI types.

In one embodiment, the multiplexing module 21 is configured to concatenate UCI of the PUCCHs carrying the same type of UCI in following priority orders: in order of time of PUCCH, in order of symbol number of PUCCH, and in order of frequency domain position of PUCCH.

In one embodiment, the multiplexing module 21 is configured to: perform concatenation in order of UCI type: HARQ-ACK, SR and CSI.

In the embodiments of the present disclosure, by making the end position of the first uplink physical channel satisfy the constraint, the timeliness of the uplink physical channel is ensured, which allows a more compact and efficient time sequence.

Figure 13:
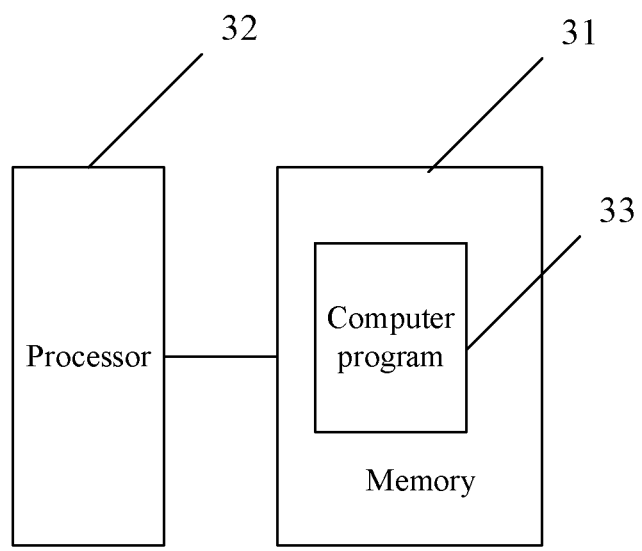

As shown in FIG. 13, the embodiments of the present disclosure further provide an information transmission apparatus, including a memory 31, a processor 32, and a computer program 33 which is stored on the memory 31 and is capable of being executed on the processor 32. The processor 32 performs the above information transmission method when executing the computer program 33.

The information transmission apparatus can be used in UE and/or a base station.

The embodiments of the present disclosure further provide a computer-readable storage medium having computer-executable instructions stored thereon, and the computer-executable instructions are configured to perform the above information transmission method.

In the embodiments, the above storage media may include, but are not limited to, various media capable of storing program codes, such as Universal Serial Bus Flash Disks (USB flash disks), Read-Only Memories (ROMs), Random Access Memories (RAMs), mobile hard disks, magnetic disks, and optical discs.

The functional modules/units in all or some of the steps, the systems, and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or step may be performed through cooperation of several physical components. Some or all of the components may be implemented as software executed by a processor, such as a digital signal processor or a microprocessor, or may be implemented as hardware, or may be implemented as an integrated circuit, such as an application specific integrated circuit. Such software may be distributed on computer-readable media, which may include computer storage media (or non-transitory media) and communication media (or transitory media). The term "computer storage media" includes volatile/nonvolatile and removable/non-removable media used in any method or technology for storing information (such as computer-readable instructions, data structures, program modules and other data). The computer storage media include, but are not limited to, RAMs, ROMs, Electrically Erasable Programmable Read-Only Memories (EEPROMs), flash memories or other memory techniques, Compact Disc Read-Only Memories (CD-ROMs), Digital Video Disks (DVDs) or other optical discs, magnetic cassettes, magnetic tapes, magnetic disks or other magnetic storage devices, or any other media which can be used to store the desired information and can be accessed by a computer. In addition, the communication media generally include computer-readable instructions, data structures, program modules or other data in a modulated data signal, such as a carrier wave or other transmission mechanism, and may include any information delivery media.

What is claimed is:

1. An information transmission method, comprising:
    in response to a plurality of uplink physical channels existing in a time slot, multiplexing information carried by the plurality of uplink physical channels to one or more first uplink physical channels; and
    transmitting the information through the one or more first uplink physical channels according to the multiplexing result,
    wherein the plurality of uplink physical channels comprise a plurality of Physical Uplink Control Channels (PUCCHs); and multiplexing the information carried by the plurality of uplink physical channels to the one or more first uplink physical channels is achieved with at least one of the following methods:
    preferentially multiplexing the PUCCHs carrying a same type of Uplink Control Information (UCI);
    multiplexing the plurality of PUCCHs in a two-by-two multiplexing way.

2. The method of claim 1, wherein the plurality of uplink physical channels meet at least one of the following conditions:
    the plurality of uplink physical channels overlap in terms of time domain; or
    the plurality of uplink physical channels include an Ultra Reliable Low Latency Communication (URLLC) channel.

3. The method of claim 1, wherein transmitting the information through the one or more first uplink physical channels comprises transmitting the information through the one or more first uplink physical channels in response to being determined that end positions of the one or more first uplink physical channels satisfy a constraint comprising at least one of the following constraints:
    the end positions of the one or more first uplink physical channels are not later than a latest end position of the plurality of uplink physical channels;
    the plurality of uplink physical channels comprise a URLLC channel, and the end positions of the one or more first uplink physical channels are not later than a latest end position of the URLLC channel; or
    the plurality of uplink physical channels comprise a URLLC channel, and an interval exists between the end positions of the one or more first uplink physical channels and a transmission of a subsequent channel or subsequent signal of the URLLC channel, and the interval comprises duration of decoding of a corresponding first uplink physical channel and duration of preparation of data to be transmitted through the subsequent channel or subsequent signal.

4. The method of claim 1, wherein the step of multiplexing the information carried by the plurality of uplink physical channels to the one or more first uplink physical channels comprises:
directly multiplexing the information carried by the plurality of uplink physical channels to the one or more first uplink physical channels; or
multiplexing the information carried by the plurality of uplink physical channels to one or more second uplink physical channels, and multiplexing information carried by the one or more second uplink physical channels to the one or more first uplink physical channels.

5. The method of claim 4, further comprising determining that end positions of the one or more second uplink physical channels satisfy a constraint.

6. A non-transitory computer-readable storage medium having computer-executable instructions stored thereon, which when being executed by a processor, cause the processor to perform the information transmission method of claim 1.

7. The method of claim 1, wherein the multiplexing the plurality of PUCCHs in a two-by-two multiplexing way comprises:
determining two PUCCHs from the plurality of PUCCHs according to a preset principle; and
multiplexing the determined two PUCCHs in response to the determined two PUCCHs overlapping in terms of time domain.

8. The method of claim 7, wherein the preset principle comprises an earliest-in-time principle, in which a PUCCH being earliest in time is determined.

9. The method of claim 8, wherein the preset principle further comprises a symbol number principle, in which a PUCCH having the most symbols is preferentially determined.

10. The method of claim 7, wherein in a case where the determined two PUCCHs are multiplexed, the multiplexing is performed to obtain a PUCCH, and the obtained PUCCH and remaining PUCCHs of the plurality of PUCCHs are taken as new to-be-multiplexed PUCCHs and are further multiplexed by the two-by-two multiplexing way.

11. The method of claim 7, wherein in response to the determined two PUCCHs not overlapping in terms of time domain, the determined two PUCCHs are not multiplexed, the earlier one in the determined two PUCCHs is not taken as a to-be-multiplexed PUCCH, while the later one in the determined two PUCCHs and remaining PUCCHs of the plurality of PUCCHs are taken as new to-be-multiplexed PUCCHs and are further multiplexed by the two-by-two multiplexing way.

12. An information transmission method, comprising:
in response to a plurality of uplink physical channels existing in a time slot, multiplexing information carried by the plurality of uplink physical channels to one or more first uplink physical channels; and
transmitting the information through the one or more first uplink physical channels according to the multiplexing result,
wherein the plurality of uplink physical channels comprise a plurality of Physical Uplink Control Channels (PUCCHs); and the step of multiplexing the information carried by the plurality of uplink physical channels to the one or more first uplink physical comprises:
for UCI of a plurality of types, concatenating UCI of the PUCCHs carrying a same type of UCI; and
concatenating the UCI of all the types obtained by the concatenation in order of UCI type.

13. The method of claim 12, wherein the step of concatenating the UCI of the PUCCHs carrying the same type of UCI comprises:
concatenating the UCI of the PUCCHs carrying the same type of UCI in following priority orders:
in order of time of PUCCH, in order of symbol number of PUCCH, and in order of frequency domain position of PUCCH.

14. The method of claim 12, wherein the step of concatenating the UCI of all the types obtained by the concatenation in order of UCI type comprises:
concatenating the UCI of all the types obtained by the concatenation in order of Hybrid Automatic Repeat request-Acknowledgement (HARQ-ACK), Scheduling Request (SR), and Channel State Information (CSI).

15. An information transmission device, comprising a memory storing instructions and a processor in communication with the memory, wherein the processor is configured to execute the instructions to perform the method of claim 12.

16. An information transmission device, comprising a memory storing instructions and a processor in communication with the memory, wherein the processor is configured to execute the instructions to:
multiplex, in response to a plurality of uplink physical channels existing in a time slot, information carried by the plurality of uplink physical channels to one or more first uplink physical channels; and
transmit the information through the one or more first uplink physical channels according to the multiplexing result,
wherein the plurality of uplink physical channels comprise a plurality of Physical Uplink Control Channels (PUCCHs); and multiplexing the information carried by the plurality of uplink physical channels to the one or more first uplink physical channels is achieved with at least one of the following methods:
preferentially multiplexing the PUCCHs carrying a same type of Uplink Control Information (UCI);
multiplexing the plurality of PUCCHs in a two-by-two multiplexing way.

17. The device of claim 16, wherein the processor is further configured to execute the instructions to determine that the plurality of uplink physical channels meet at least one of the following conditions:
the plurality of uplink physical channels overlap in terms of time domain; or
the plurality of uplink physical channels comprise a URLLC channel.

18. The device of claim 16, wherein the processor is further configured to execute the instructions to transmit the information through the one or more first uplink physical channels in response to being determined that end positions of the one or more first uplink physical channels satisfy a constraint comprising at least one of the following constraints:
the end positions of the one or more first uplink physical channels are not later than a latest end position of the plurality of uplink physical channels;

the plurality of uplink physical channels comprise a URLLC channel, and the end positions of the one or more first uplink physical channels are not later than a latest end position of the URLLC channel; or the plurality of uplink physical channels include a URLLC channel, and an interval exists between the end positions of the one or more first uplink physical channels and a transmission of a subsequent channel or subsequent signal of the URLLC channel, and the interval comprise duration of decoding of a corresponding first uplink physical channel and duration of preparation of data to be transmitted through the subsequent channel or subsequent signal.

\* \* \* \* \*